(12) United States Patent
Daly et al.

(10) Patent No.: US 9,181,933 B2
(45) Date of Patent: Nov. 10, 2015

(54) TEMPERATURE CONTROL DEVICE WITH A PASSIVE THERMAL FEEDBACK CONTROL VALVE

(71) Applicant: Alcatel-Lucent Ireland Ltd., Dublin (IE)

(72) Inventors: John Daly, Tralee (IE); Nick Jeffers, Delgany (IE)

(73) Assignee: Alcatel Lucent, Boulogne-Billancourt (FR)

( * ) Notice: Subject to any disclaimer, the term of this patent is extended or adjusted under 35 U.S.C. 154(b) by 260 days.

(21) Appl. No.: 13/710,052

(22) Filed: Dec. 10, 2012

(65) Prior Publication Data

US 2014/0157769 A1    Jun. 12, 2014

(51) Int. Cl.
  *F01B 29/10*    (2006.01)
  *F03G 7/06*    (2006.01)
(52) U.S. Cl.
  CPC ........... *F03G 7/065* (2013.01); *Y10T 29/49826* (2015.01)
(58) Field of Classification Search
  CPC ..................... F03G 7/065; Y10T 29/49826
  USPC ............... 60/527–529; 310/306–307; 251/11; 337/141; 29/428
  See application file for complete search history.

(56) References Cited

U.S. PATENT DOCUMENTS

| | | | | |
|---|---|---|---|---|
| 4,523,605 A | * | 6/1985 | Ohkata | 137/62 |
| 4,932,429 A | * | 6/1990 | Watanabe et al. | 137/62 |
| 4,979,672 A | * | 12/1990 | AbuJudom et al. | 236/68 B |
| 5,182,910 A | * | 2/1993 | Benecke | 60/529 |
| 5,619,177 A | * | 4/1997 | Johnson et al. | 337/140 |
| 5,865,418 A | * | 2/1999 | Nakayama et al. | 251/11 |
| 6,019,113 A | * | 2/2000 | Allston et al. | 137/1 |
| 6,247,493 B1 | * | 6/2001 | Henderson | 137/487.5 |
| 7,350,762 B2 | * | 4/2008 | MacGregor et al. | 251/11 |

OTHER PUBLICATIONS

Song, G., et al., "Applications of shape memory alloys in civil structures", G. Song et al./Engineering Structures, 28 (2006), pp. 1266-1274.

* cited by examiner

*Primary Examiner* — Hoang Nguyen
(74) *Attorney, Agent, or Firm* — Hitt Gaines, PC (57) ABSTRACT

A device, comprising a flow controller. The flow controller includes a body having walls that define a channel within the body, and a passive flow control valve. The passive control valve has a moveable member that includes a thermal shape memory material, the moveable member configured to change an aperture size in the channel in response to a reversible temperature-induced shape transformation of the thermal shape memory material.

20 Claims, 9 Drawing Sheets

TEMPERATURE CONTROL DEVICE WITH A PASSIVE THERMAL FEEDBACK CONTROL VALVE

TECHNICAL FIELD

The invention relates to in general, a temperature device and, more specifically, to a device used to maintain the temperature of electronic and photon circuits and methods for manufacturing the same.

BACKGROUND

This section introduces aspects that may help facilitate a better understanding of the inventions. Accordingly, the statements of this section are to be read in this light and are not to be understood as admissions about what is prior art or what is not prior art.

The power densities of contemporary electronic and photonic components are ever-increasing while the available area over which the heat can be dissipated is reducing. Chip level thermal problems typically have the effect of decreasing reliability and increasing power consumption for operation, and, as a result, thermal issues have become a significant roadblock in the development of such circuits.

With the need for increased power dissipation at the device level, conventional forced air convection may no longer be sufficient in some cases, thus pushing alternative heat transfer techniques to the forefront. Liquid cooling within the chip or package using micro-channels is seen as a promising alternative, because the thermal energy is removed directly from where it is generated within the chip or package.

Flow rate control within the micro-channel allows variable amounts of energy to be removed by the fluid, which, in turn, provides a means of thermal control. Such thermal control is particularly important to certain circuits where thermal control, rather than simply bulk cooling, is desirable.

SUMMARY

One embodiment is a device, comprising a flow controller. The flow controller includes a body having walls that define a channel within the body, and a passive flow control valve. The passive control valve has a moveable member that includes a thermal shape memory material, the moveable member configured to change an aperture size in the channel in response to a reversible temperature-induced shape transformation of the thermal shape memory material.

In some such embodiments, the thermal shape memory material is a shape memory alloy. In some embodiments, the thermal shape memory material is a nitinol alloy. In any of the above embodiments, the moveable member can include a bilayer that has a layer of the thermal shape memory material and a layer of high yield strength material, wherein the high yield strength material does not permanently deform throughout the temperature-induced shape transformation of the thermal shape memory material and the high yield strength material has a yield strength of at least about 200 MPa. In any of the above embodiments, the flow controller further can include a flexible portion of one or more of the walls defining the channel, wherein the moveable member located outside of the channel can be configured to move the flexible portion to change the aperture size in response to the temperature-induced shape transformation in the thermal shape memory material. In some such embodiments, the moveable member can be adjacent to the flexible portion of the one or more walls. In any of the above embodiments, the flow controller can further include a stripe of thermally conductive material configured to thermally link a heat source component of the device to the thermal shape memory material, the stripe being configured to induce the temperature-induced shape transformation by a change in temperature of the stripe. In any of the above embodiments, the thermal shape memory material can be located in the channel and a fluid in the channel can be capable of inducing the temperature-induced shape transformation by a change in temperature of the fluid in the channel. In any of the above embodiments, a portion of the moveable member can be coupled to one of the walls of the channel. In some such embodiments, a portion of the moveable member can be coupled to a cap layer, the cap layer defining at least one of the walls. Some such embodiments can include a thermal insulating layer located between the cap layer and the body. In any of the above embodiments, the passive flow control valve can include two or more of the moveable members, each one of the moveable members configured to change the aperture size at a different temperature. In any of the above embodiments, the device can includes a network of flow controllers, wherein each one of the flow controllers can be configured to control the flow rate of a fluid through the channel. In some such embodiments, two or more of the flow controllers can be configured to operate in cooperation with each other to increase the flow rate to one heat source component and decrease the flow rate to one or more other heat source components.

Another embodiment is method of manufacturing a device that comprises forming a flow controller, such as any of the above-described flow controllers. Forming the flow control includes providing a body having walls that define a channel within the body, and, coupling a passive flow control valve to the channel. The passive flow control valve has a moveable member that includes a thermal shape memory material, the moveable member configured to change an aperture size in the channel when the thermal shape memory material undergoes a reversible temperature-induced shape transformation.

In some embodiments, providing the body includes providing a flexible portion of one or more of the walls defining the channel, wherein the moveable member can be configured to move the flexible portion to change the aperture size in response to the temperature-induced shape transformation in the thermal shape memory material. In some embodiments, coupling the passive flow control valve to the channel includes coupling the moveable member to an outer surface of at least one of the walls defining the channel. In some embodiments, coupling the passive flow control valve to the channel includes coupling a portion of the moveable member to an inner surface of at least one of the walls of the channel. In any of the above embodiments, providing the moveable member can include a bilayer of the thermal shape memory material and a high yield strength material having a yield strength of at least about 200 MPa. Any of the above embodiments can include providing a stripe of thermally conductive material configured to thermally link a heat source component of the device to the thermal shape memory material, the stripe being configured to induce the temperature-induced shape transformation by a change in temperature of the stripe.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Various devices having an active valve control system can include actuation components based on electromagnetic, piezoelectric, bimetallic thermopenumatic, or shape memory material principles, where an actuation component is under active control. For instance, an actively controlled thermal actuation component might require a feedback loop that includes an electrical control input, a temperature sensor, and proportional-integral-derivative controller. Not only do these components occupy valuable space on a circuit platform, they also can potentially consume power and generate additional heat, thereby compounding problems with chip-level thermal control.

In contrast, embodiments of the present disclosure benefit from implementing a passive thermal feedback control valve. Thermal feedback from a heat-generating component, e.g., a component that the device is intended to temperature-regulate, is used to control the size of aperture of a valve. The size of the aperture, in turn, controls the delivery of cooling fluid through a channel to the heat-generating component, or, a different heat-generating component. Because a passive control valve is used, the need for potentially space-occupying and heat-generating additional control components is obviated. For example, no electrical inputs have to be used to operate the disclosed passive control valve in configurations where, e.g., the valve is used to control the temperature of heat-generating component of an integrated circuit. The heat-generating component, e.g., active electronic or optical components or passive generating components such as resistors, can be directly or indirectly thermally linked to the passive control valve to provide a passive thermal feedback loop to the valve.

Figure 1:
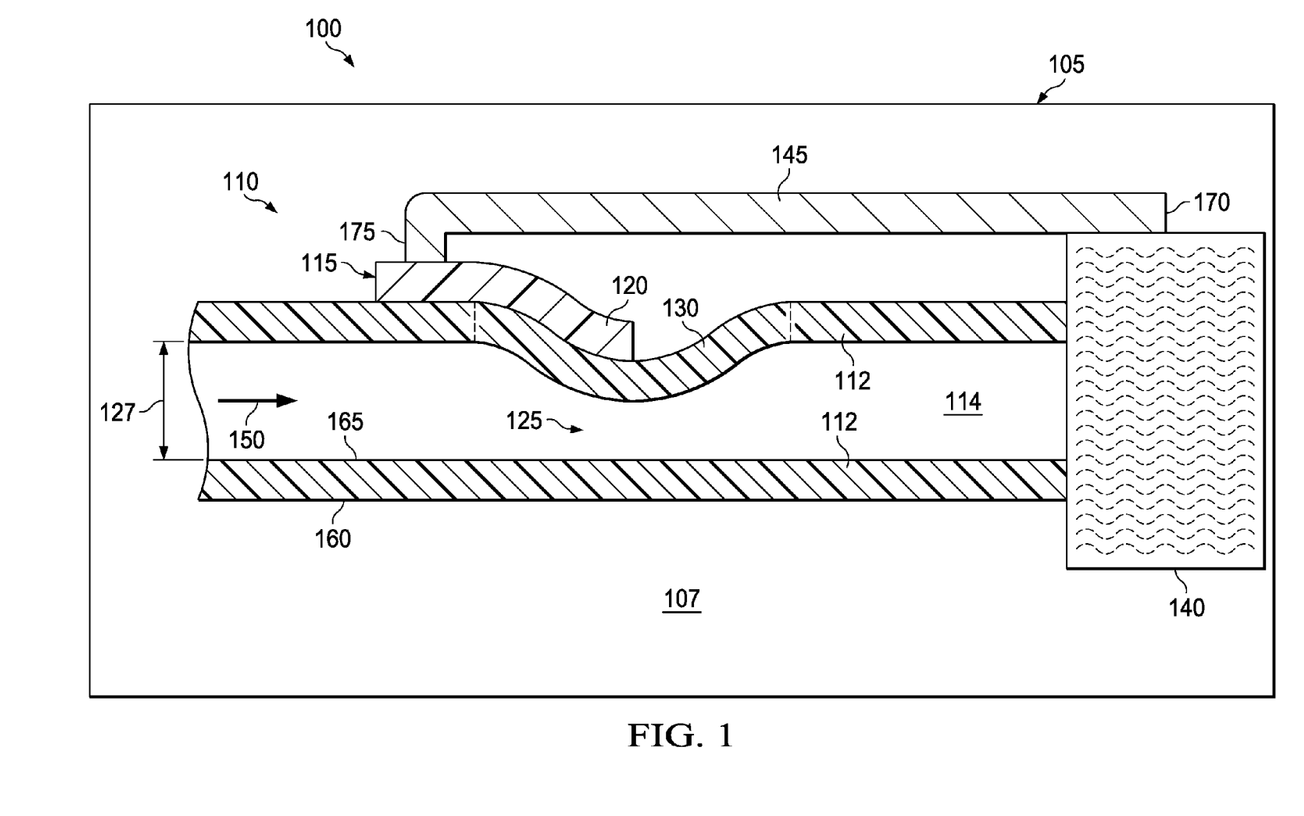
FIG. 1 presents a plan view of an example device of the present disclosure at a first state of valve actuation.
Figure 2:
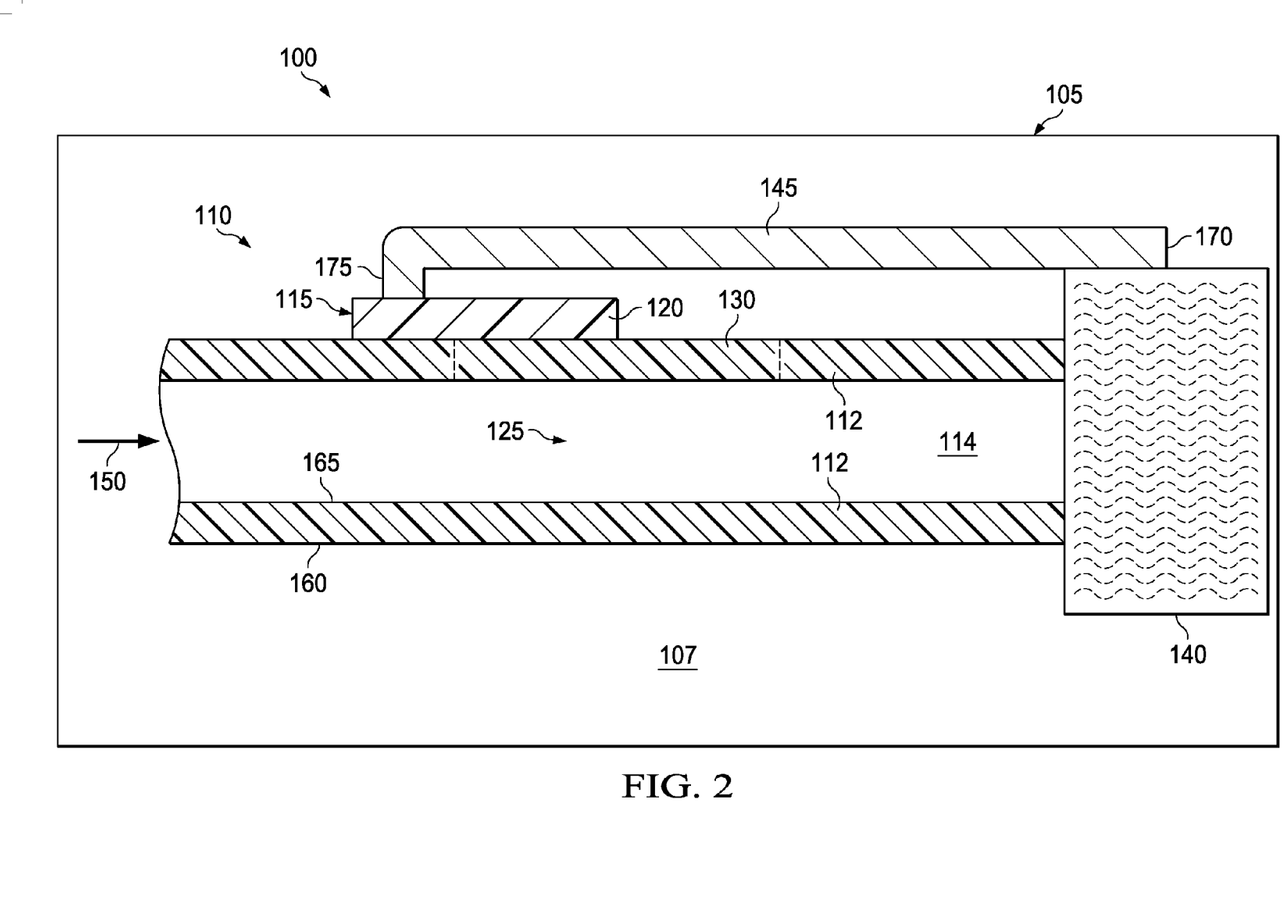
FIG. 2 presents a plan view of the example device of FIG. 1 at a second different state of valve actuation.

One embodiment of the disclosure is a device. FIGS. 1 and 2 present plan views of an example device 100 of the present disclosure, at two different states of valve actuation, e.g., restricted, up to being fully closed in some embodiments, and open, respectively.

The device 100 comprises a flow controller 105, the flow controller 105 including a body 107 and a passive control valve 110. The body 107 (e.g., a silicon wafer or metal body in some cases) has walls 112 that define a channel 114 within the body 110. The passive control valve 110 has a moveable member 115. The moveable member 115 includes a thermal shape memory material 120, and, the moveable member 115 is configured to change an aperture 125 size in the channel 114 in response to a reversible temperature-induced shape transformation of the thermal shape memory material 120. For instance, when the thermal shape memory material 120 undergoes a reversible temperature-induced shape transformation, the aperture 125 size in the channel 114 changes.

In some embodiments, the device 100 can be a temperature control device that, e.g., can be mounted on, or otherwise be coupled to, an integrated circuit having heat-components thereon. In some cases, the device 100 can be an electrical or optical device with the above-described flow controller 105 included as part of an integrated circuit device.

The term passive control valve as used herein means that there are no electrical components necessary to control the moveable member to adjust the flow of fluid through the channel 114, e.g., by applying an electromagnetic force to act on the thermal shape memory material 120.

In some example embodiments, the channel 114 can be a micro-channel, e.g., a channel having an internal width 127 or height (perpendicular to the width 127 for the view shown in FIG. 1) of 1 mm or less.

The term thermal shape memory material 120, as used herein refers to a material capable of reversibly changing between two different shapes: one shape at low temperatures, and another different shape at the higher temperature. For instance, above a threshold temperature, that is particular to the material 120, a solid-state transition in the material 120 occurs, and the transition results in the material 120 taking on a particular original forged shape that the material 120 has a "memory" of, referred to herein as a shape memory. This shape memory can be configured to actuate an increase or decrease in the size of the aperture 125, depending upon the particular application of the valve 110. When the temperature is decreased below the same or a different threshold temperature, depending on the particular material 120 being used, the material 120 becomes more ductile and therefore can readily lose its shape memory. Consequently, the valve's 110 actuation state can be reversed.

In some cases, as illustrated in FIG. 1, the moveable member 115 can be composed of a single layer of the thermal shape memory material 120. Above the threshold temperature, the thermal shape memory material 120 can be configured to, e.g., have an original forged shape such that the value 110 restricts or closes the aperture 125 in the channel 114, as shown in FIG. 1. Below the threshold temperature, as illustrated in FIG. 2, the shape memory material 120 becomes ductile, and the force of the flow of fluid through the channel 114 can push the valve 110 back open, e.g., by transforming the shape memory material 120 to have a straightened shape.

One skilled in the art would be familiar with procedures to manipulate the composition of the thermal shape memory material 120 (e.g., the ratio of metal alloys in some cases) to adjust the threshold temperature of the material 120 to a desired value. The particular choice of thermal shape memory material 120 used in the valve 110 can depend upon the force and range of motion that the moveable member 115 is designed to have. For instance, in some embodiments, the thermal shape memory material 120 can be a shape memory alloy such as copper-zinc or gold-cadmium alloys. In some embodiments, the thermal shape memory material 120 can be a nickel-titanium alloy, such as Nitinol. Nitinol is desirable in certain applications because this shape memory alloy has a rigid super-elastic state, with a high yield strength above its threshold temperature (e.g., an austenite crystal structure) and a highly ductile state below its transition temperature (e.g., a martensite crystal structure). In still other embodiments, however, the thermal shape memory material 120 can be thermally induced shape-memory polymer, or other non-metal alloy material.

Figure 3:
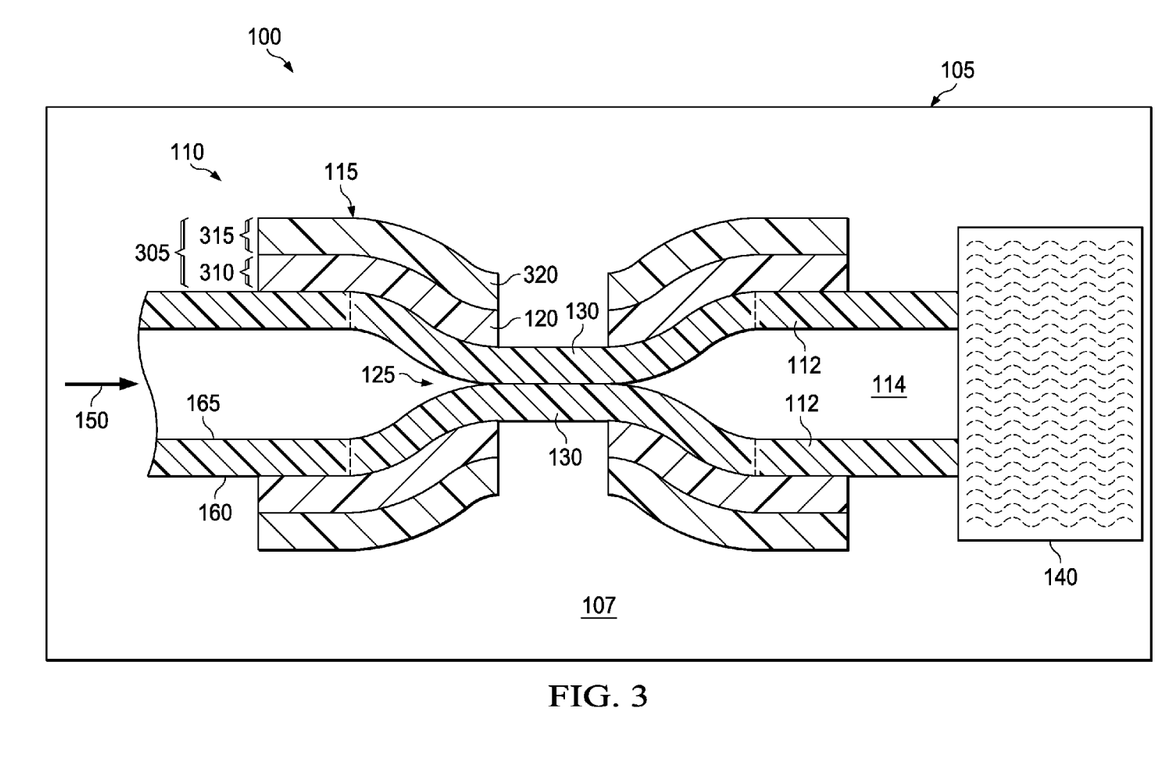
FIG. 3 presents a plan view of another example device of the present disclosure at a first state of valve actuation.
Figure 4:
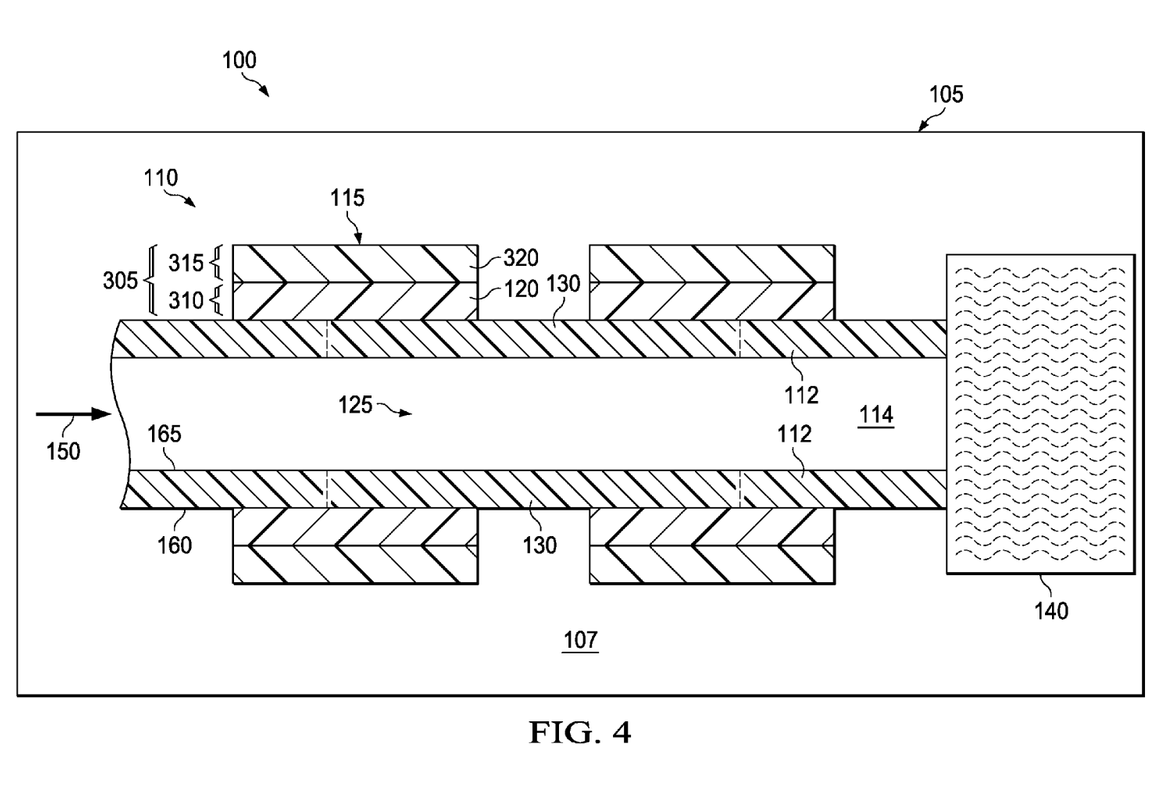
FIG. 4 presents a plan view of the example device of FIG. 3 at a second different state of valve actuation.

FIGS. 3 and 4 present a plan view of another example device 100 of the present disclosure, at two different states of valve actuation, respectively.

As illustrated in FIGS. 3 and 4, in some embodiments of the device 100, the moveable member 115 includes a bilayer 305 having a layer 310 the thermal shape memory material 120 and a layer 315 of high yield strength material 320. The high yield strength material 320 does not permanently deform throughout the temperature-induced shape transformation of the thermal shape memory material 120. For instance, throughout the full operating temperature of the device 100, the high yield strength material 320 is configured to not be permanently deformed by the temperature-induced shape change associated with passing above the threshold temperature of the thermal shape memory material 120. For instance, in some embodiments, at temperatures below the temperature that causes the temperature-induced shape in the thermal shape memory material 120, the high yield strength material 320 can resume its original shape (e.g., height, width length) within about 10 percent and in some cases within about 1 percent. One of skill in the art would understand how to manipulate the composition of the high yield strength material 320 (e.g., by adjusting the ratio of metal alloys, in some cases) so as to have the appropriate yield strength throughout the operating temperature of the device 100. For example, in some cases, the high yield strength material 320 can be a shape memory alloy, such as Nitinol, having a threshold temperature that is below the operating temperature range of the device 100. In some embodiments, such as when the high yield strength material 320 is composed of Nitinol in an austenite crystal structure, the high yield strength material 320 can have a yield strength equal to at least about 200 MPa, and in some cases, at least about 500 MPa.

The layer 315 of the high yield strength material 320 can act on the moveable member 115 such that the valve's 110 actuation state is rapidly returned to the state it was in before the thermal shape memory material 120 underwent it's shape change induced by increasing the temperature above the material's 120 threshold temperature. In the example embodiment presented in FIGS. 3-4, the original forged shape of the thermal shape memory material 120 is configured to put the valve 110 in an open state. As illustrated in FIG. 3, the layer 315 of the high yield strength material 320 can be configured to yield, but not permanently deform, when the layer 310 of the thermal shape memory material 120 undergoes it's temperature-induced shape transformation, which, in the example, causes the aperture's 125 size to increase, and thereby put the valve 110 in an open state.

As further illustrated in FIG. 4, when the temperature of the thermal shape memory material 120 drops below it's threshold temperature, and the material 120 becomes ductile, the high yield strength material 320 acts on the moveable member 115 such that the valve's 110 actuation is returned to the restricted, in some cases closed, state that it was in before the temperature induced change of the thermal shape memory material 120 into it's memory shape. In some such embodiments, when the high yield strength material 320 is made of, e.g., a shape memory alloy, the high yield strength material 320 can have an original forged shape that acts on the moveable member 115 such that the valve 110 is in a restricted state.

FIGS. 1-4 illustrate example embodiments of the flow controller 105 having a pinch control valve 110, in which the moveable member 115 is positioned in a location that is external to the channel 114. In some such embodiments, the valve's 110 operation can be facilitated by providing the controller 105 with a flexible wall portion 130 (e.g., as bounded by the vertical dash lines in the figures) of one or more of the walls 112. In some embodiments, the moveable member 115 located outside of the channel 114 is configured to move the flexible portion 130 to change the aperture size 125 in response to the temperature-induced shape transformation in the thermal shape memory material 120. For instance, in some cases, the temperature-induced shape transformation in the thermal shape memory material 120 can be configured to cause the moveable member 115 located outside of the channel 114 to move the flexible portion 130 to change the aperture 125 size.

In some cases, the flexible portion 130 can include, or be made of, a thin metal film, for example, a thinned-down portion of the wall 112. One skilled in art would understand how to adjust the flexible portion 130 wall thickness 135 such that pinching down on the portion 130 does not cause movement beyond the elastic strain limit of the metal that the flexible portion 130 is composed of. In other cases, the flexible portion 130 can include, or be made of, a plastic material, such as Polytetrafluoroethylene (PTFE), polyetheretherketone (PEEK), or similar flexible polymers. Using a flexible portion 130 that includes a plastic material can advantageously impart the flexible portion 130 with fatigue resistance, and thereby prolong the operating life of the flow controller 105.

As illustrated in FIGS. 1-4 in some cases, the moveable member 115 is adjacent to the flexible portion 130, so that the motion of the member 115 directly acts upon the flexible portion 130. Such embodiments advantageously eliminate the need for additional moveable parts, e.g., to translate the movement of the member 115 into the movement of the flexible portion 130 of the wall 112. This, in turn, can help reduce the wear and tear, and the eventual failure, of such additional parts. In other embodiments, however, it may be advantageous to include such additional parts (e.g., configured as a piston or lever) to produce a greater range of motion, or, greater force, on the flexible portion 130.

In some cases, the passive control valve 110, in particular the thermal shape memory material 120, can be positioned proximate to the heat source 140 (e.g., herein also referred to as heat-generating component) of the device 100, thereby facilitating thermal feedback from the source 140 (e.g., heat-generating device component) to the valve 110, with the use of no additional component parts.

In other embodiments, such as illustrated in FIGS. 1-2, the flow controller 105 further includes a stripe 145 of thermally conductive material configured to thermally link a heat source component 140 of the device to the thermal shape memory material 120, the stripe 145 being configured to induce the temperature-induced shape transformation by a change in temperature of the stripe 145. Examples of suitable materials for the thermal linking stripe 145 include metals having a high thermal conductivity, such as gold, copper, graphene, encapsulated graphite (e.g., K-Core Thermacore, Inc., Lancaster, Pa.), or, metal hybrid materials, such copper-graphite.

In such embodiments, the temperature-induced shape transformation can be induced by a change in temperature of the stripe 145. The thermal linking stripe 145 can facilitate providing thermal feedback when the passive control valve 110 and the thermal shape memory material 120 is located remotely from the heat generating component 140, or, in for cases were there is a high level of thermal resistance through the walls 112. Additionally, the thermal linking stripe 145 can be advantageously used to provide either down-stream or up-stream thermal feedback to the valve 110. For instance, as shown for the example device 100 in FIGS. 1-2, the stripe 145 thermally links the example valve 110 located up-stream to the heat generating component 140 because fluid flowing through the valve 110, in direction 150, subsequently reaches heat generating component 140.

Figure 5:
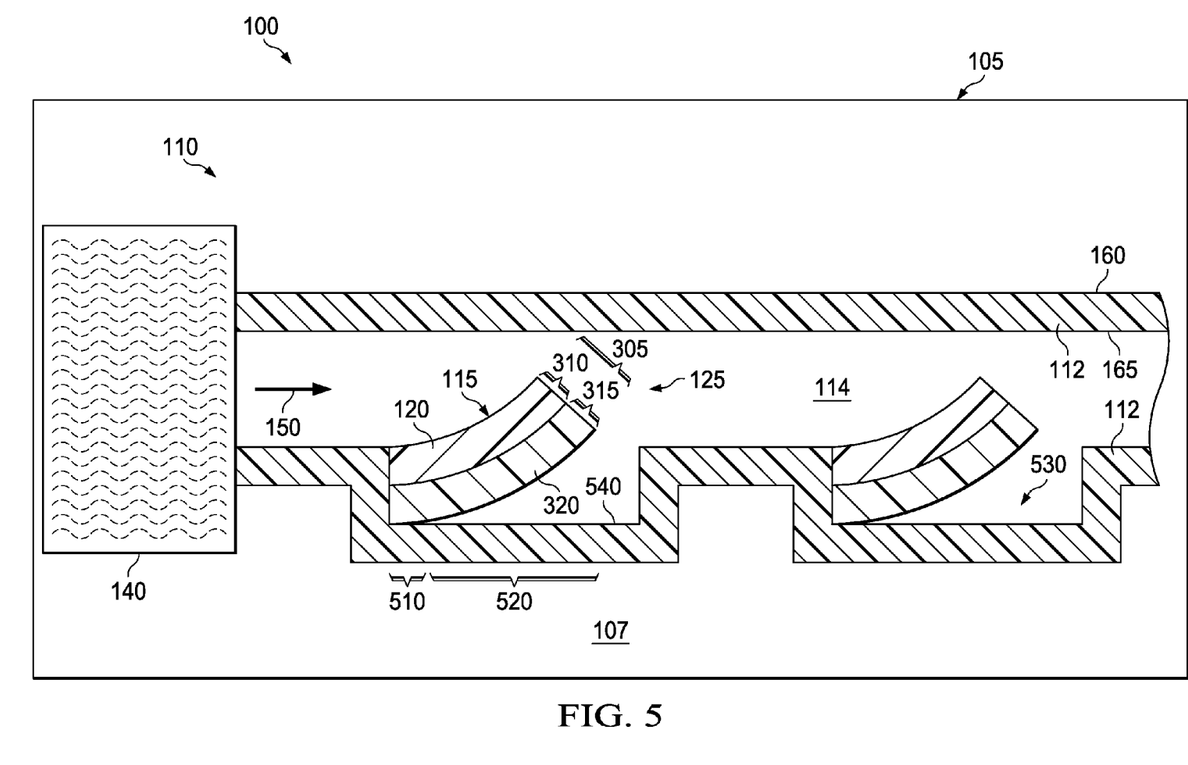
FIG. 5 presents a plan view of another example device of the present disclosure at a first state of valve actuation.
Figure 6:
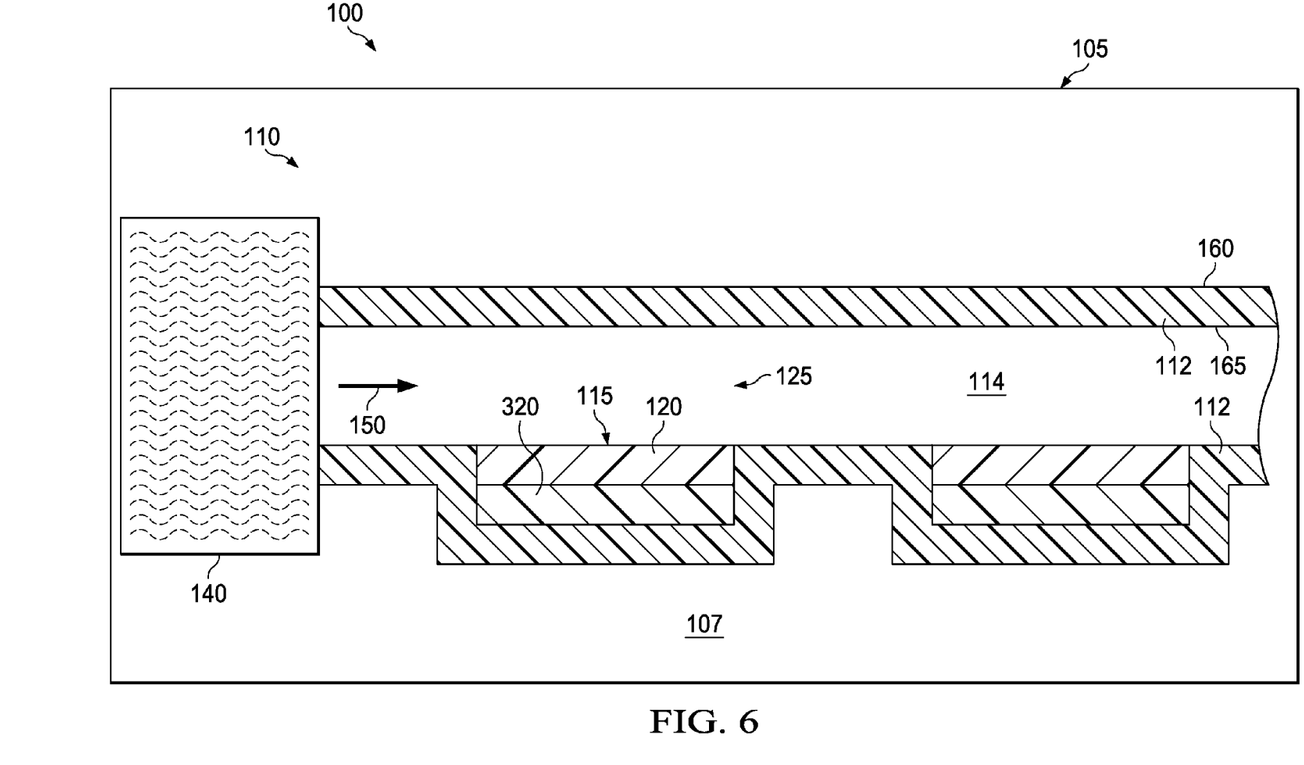
FIG. 6 presents a plan view of the example device of FIG. 5 at a second different state of valve actuation.

FIGS. 5 and 6 present a plan view of another example device 100 of the present disclosure, at two different states of valve actuation, respectively. As illustrated in FIGS. 5 and 6, the thermal shape memory material 120 is located in the channel 114, and, the temperature-induced shape transformation can be induced by a change in temperature of a fluid in the channel 114. For instance, the thermal shape memory material 120 can be located in the channel 114 and a fluid in the channel 114 can be capable of inducing the temperature-induced shape transformation by a change in temperature of the fluid in the channel 114. Such embodiments can advantageously dispense with the thermal linking stripe 145, such as discussed in the context of FIGS. 1 and 2. Another advantage of such embodiments is that the moveable member 115, by being located within the channel 112, is thermally isolated from extraneous external temperature effects. Still another advantage is that there is no need to deform the channel wall 112 to change the aperture 125 size in the channel 114, which in turn, can eliminate the need for having a flexible portion 130 of the wall, and/or, avoid fatigue failure from repeatedly moving the wall 112 or the flexible wall portion 130.

As illustrated for the example embodiment shown in FIGS. 5 and 6, the within-channel valve 110 can be located down-stream from the location of the heat-generating component 140. Such an embodiment facilitates providing thermal feedback from the heat-generating component 140 to the valve 110 via the fluid moving (e.g., in direction 150) from the vicinity of the valve 110 to the thermal shape memory material 120 in the channel 114. However, in other embodiments, the valve 110 and the thermal shape memory material 120 could be located up-stream from the heat-generating component 140. Such an embodiment could benefit from the use of a stripe 145, similar to that discussed in the context of FIGS. 3 and 4, thermally linking the heat-generating component 140 to a location proximate to where the thermal shape memory material 120 is located in the channel 114.

In some embodiments, such as illustrated in FIG. 5, a portion 510 of the moveable member 115 is coupled to at least one of the walls 112 of the channel 114. In some cases, the member 115 can be coupled to one of the walls 112 mechanically, e.g., using bolts, screws, clamps or other mechanical structures familiar to those skilled in the art. In other cases, the member 115 can be coupled to one of the walls 112 through chemical bonding, e.g., using solder, epoxy glue, or other chemical bonding agents familiar to those skilled in the art.

In still other embodiments, however, the moveable member 115 can be configured to be within the channel 114 but not coupled to any of the walls 112. For instance, the moveable member 115 can be confined to a region in the channel 114, e.g., through a narrowing or bend in the channel 114 that prevents the flow of fluid from carrying the moveable member 115 beyond the restricted region.

A within-channel valve 110 embodiment of the device 100, such depicted in FIGS. 5 and 6, can be configured to be in an open or a restricted state, when the thermal shape memory material 120 undergoes a temperature-induced shape transformation to a rigid, super-elastic state. For example, as illustrated in FIG. 5, the moveable member 115 is configured as a bilayer 305 that includes a layer 310 of the thermal shape memory material 120 and a layer 315 of the high yield strength material 320. The moveable member 115 is also configured to have another portion 520 that is not coupled to the wall 112, and, to have a shape that curves into the channel 114 to reduce the aperture 125 size when the thermal shape memory material 120 is below its threshold temperature. Such a configuration can put the valve 110 in a flow-restricting state. In FIG. 6, the moveable member 115 is configured to have a straighten shape which increases the aperture 125 size when the thermal shape memory material 120 is above its threshold temperature, thereby putting the valve 110 in an open state.

For example, in some cases as illustrated in FIGS. 5 and 6, one of the walls 112 can further include a trough 530 and the portion 510 the moveable member 115 can be a bonded to a surface 540 in the trough 530. As illustrated in FIG. 6, the trough 530 can be configured to contain all, or a portion, of the moveable member 115 when the moveable member 115 adopts a shape to increases the aperture 125 size. Locating the member 115 inside of the trough 530 helps increase the flow of fluid through the channel 114 when the valve 110 is in an open state.

Figure 7:
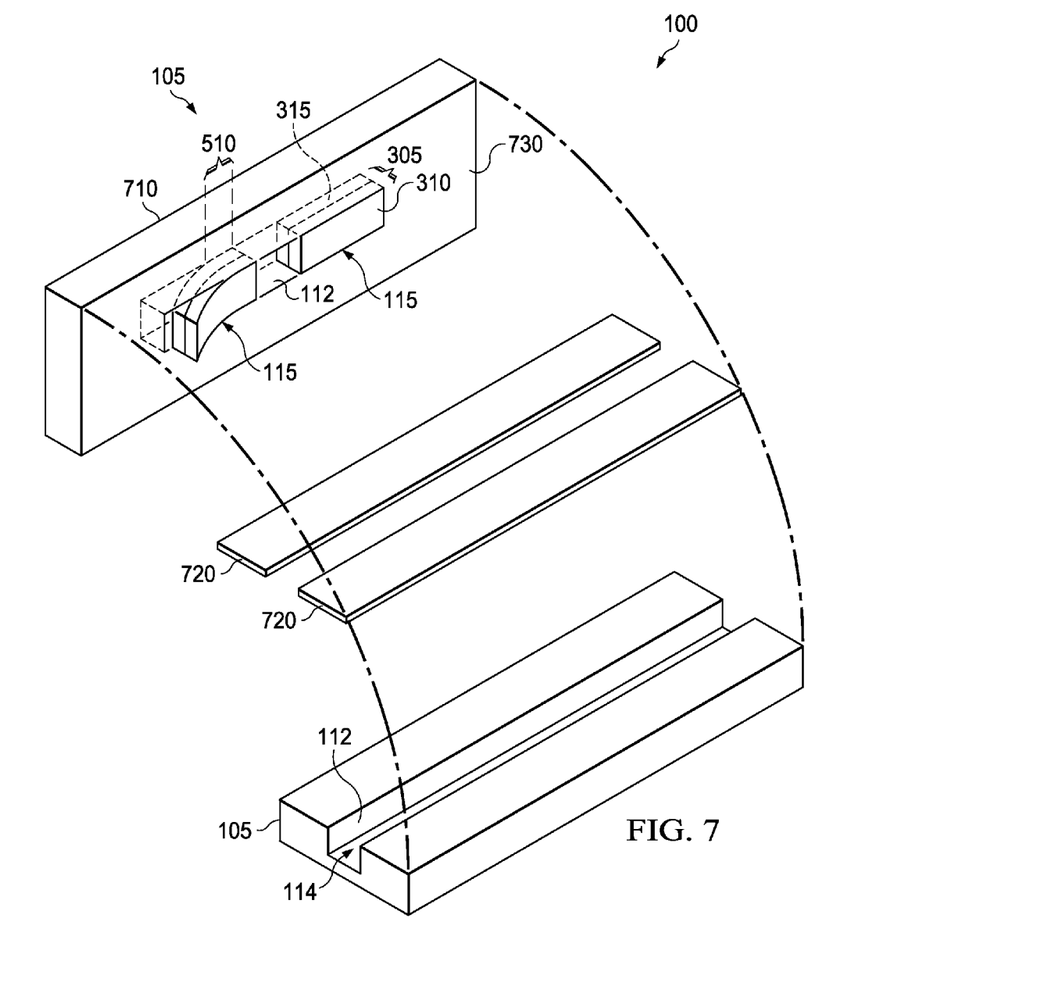
FIG. 7 presents an exploded perspective view of portions an example flow controller of the disclosure similar to the example flow controller presented in FIGS. 5 and 6.

FIG. 7 presents an exploded perspective view of portions of an example flow controller 105 of the disclosure similar to the example flow controller presented in FIGS. 5 and 6. As further illustrated in FIG. 7, in some embodiments, the portion 510 of the moveable member 115 is coupled to a cap layer 710, the cap layer 710 defining at least one of the walls 112 of the channel 114. In some example embodiments, the cap layer 710 can be made of silica and a moveable member 115 that includes a shape memory material layer 310, or bilayer 305 of the shape memory material layer 310 and the high yield strength material layer 315, can be mechanically connect or soldered or epoxied to the cap layer 710. The cap layer 710 can then be coupled to a portion of the body 107, e.g., a body composed of silicon, in some embodiments.

Providing a cap layer 710 can facilitate assembly of the flow controller 105 as well as the inclusion of optional beneficial features of the flow controller 105. For example, in some cases, as illustrated in FIGS. 5 and 6, a thermally insulating layer 720 can be located between the cap layer 710 and the body 107. In some cases, for instance, the thermally insulating layer 720, composed of silicon oxide, PEEK or PFTE, or similar insulating material, can be formed on a surface 730 of the cap layer 710 that faces the body 107. The thermal insulating layer 720, combined with a low thermally conductive silica top cap 710, can help to thermally decouple and isolate the moveable member 115. Thermally isolating the thermal shape memory material 120 from temperature changes in the ambient environment or in other heat generating components not being temperature regulated, in turn, can help prevent the valve 110 from activating prematurely.

In some embodiments of the device 100, such as illustrated in FIGS. 3-7, the passive flow control valve 105 includes two or more of the moveable members 115. In some cases, such as illustrated in FIG. 4 or 6, each of the moveable members 115 can be configured to change the aperture 125 size at a same temperature, e.g., to facilitate a greater restriction of fluid flow through the channel 114. In other cases, such as illustrated in FIG. 7, each one (or groups in some cases) of the moveable members 115 can be configured to change shape, and hence change the aperture 125 size, at a different temperature. Providing a plurality of moveable members 115 that are configured to change the aperture 125 size at a different temperature allows the flow of fluid through the channel 114 to be fine tuned to a number of discreet flow rates that are intermediate between the flow rates when the valve 110 is fully open and fully restricted. In such embodiments, the moveable members 115 can include a different thermal shape memory material 120 having a different threshold temperature for the material's 120 temperature-induced shape transformation. For instance, the ratio of nickel to titanium in a nitinol-based thermal shape memory material 120 can be adjusted to provide a different threshold temperature for each of the moveable members 115.

As illustrated in FIGS. 3 and 4, in some embodiments, pairs of the moveable members 115 can be positioned on opposing outer sides 165 of the channel 114 (e.g., the flexible portion 130) and the pairs of moveable members 115 can be configured to actuate the size of the aperture 125 by cooperatively pinching or un-pinching the channel 114 at a same temperature. However, in other embodiments, similar to that illustrated in FIGS. 5-6, the pairs of the moveable members 115 could be located on inner surfaces of walls 112 inside the channel 114, including opposing surfaces of different walls 112, and/or, could be configured to actuate the size of the aperture 125 at a same or a different temperatures.

As illustrated in FIGS. 3-7, in some embodiments, there can be a plurality of the moveable members 115 located along different portions along a length 325, either inside or outside of the channel 114. The moveable members 115 located along different lengths 325 of the channel 114 can be configured to cooperatively change the aperture 125 size at a same temperature, or, change the aperture 125 size at different temperatures.

Figure 8:
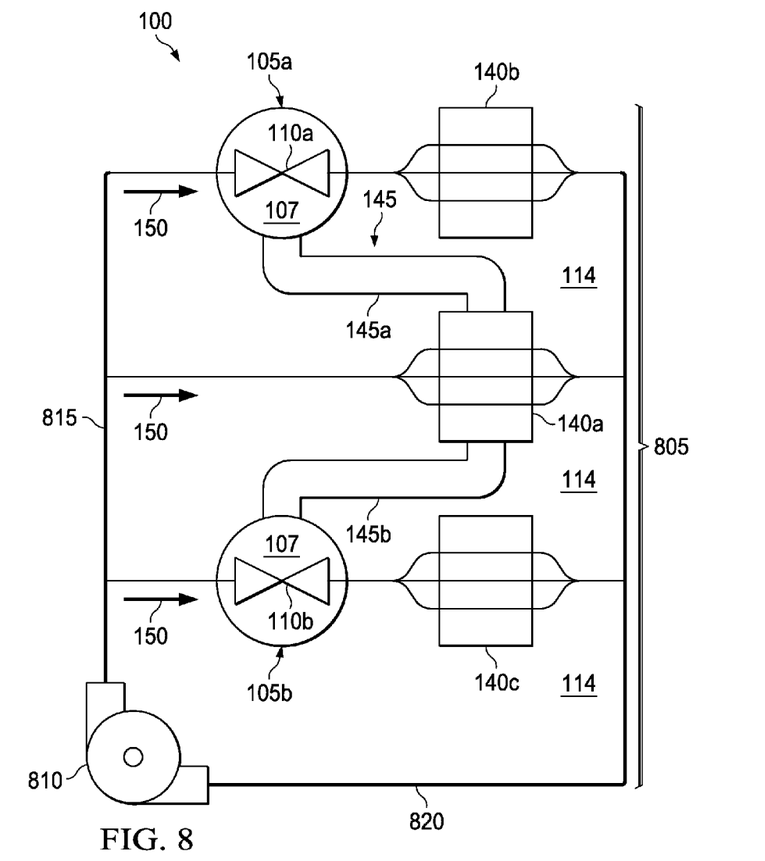
FIG. 8 presents a plan view of an example device of the present disclosure having a plurality of flow controllers, such as any of the flow controllers discussed in the context of FIGS. 1-7.

FIG. 8 presents a plan view of an example device 100 of the present disclosure having a plurality of the flow controllers, such as any of the embodiments of controllers 105 discussed in the context of FIGS. 1-7. Having a plurality of the flow controllers 105, can facilitate regulating the temperature of heat-generating components 140 to a specific value, e.g., that is conducive to the operation of the components 140 and the entire device. Although the flow controllers 105 can sometimes be configured to maximally cool one or more of the heat-generating components 140, in other cases, the flow controllers 105 are configured to control the temperature of one or more of the heat-generating components to a pre-set temperature value or range of values. For instance, in some cases, the heat-generating component 140 can be a laser or other photonic or electronic component designed to operate within a desired temperature range. If temperature of the heat-generating component 140 changes to a value outside of the desired range, the component 140 or entire device can malfunction. For example, outside of a desired temperature range a laser component 140 may be emitting light at the incorrect wavelength.

As illustrated in FIG. 8, in some cases to facilitate temperature control, the device 100 includes a network 805 of flow controllers 105, e.g., such as a plurality of the flow controllers 105. This network 805 can be configured to cooperatively control the temperature of multiple heat-generating components 140 in the device 100. For instance, in some cases, each one of the flow controllers 105 can be configured to control the flow rate of a fluid through a different one of the channels 114. For instance, in some cases, the passive flow control valve 110 can have a plurality of moveable members 115 (e.g., FIG. 1) that are each configured to adjust the aperture 125 size (e.g., FIG. 1) of the channel 114 at different temperatures and thereby fine tune the temperature control of one of the heat-generating components or heat sources 140.

As further illustrated in FIG. 8, in some embodiments, two or more of the flow controllers (e.g., controllers 105a, 105b) are configured to operate in cooperation with each other to increase the fluid flow rate to one heat-generating component (e.g., component 140a) and decrease the flow rate to one or more other heat-generating components (e.g., components 140b, 140c) when the one heat-generating component 140a reaches a temperature value. In some cases, for instance, cooling priority and/or temperature control can be directed to a primary heat-generating component 140a of the device 100. For example, the primary heat-generating component 140a can be a component that is known to malfunction, or have a shortened lifetime if the component's 140a temperature falls outside of certain desired temperature range. As the primary component's 140a temperature reaches certain preset temperature value, e.g., within the desired temperature range, valves (e.g., valve 110a and 110b) can be adjusted to restrict fluid flow to the other secondary heat-generating components 140b, 140c, and thereby allow more fluid to pass to the primary heat-generating component 140a.

As illustrated in FIG. 8, in some cases, to facilitate such temperature control, the flow controllers 105a, 105b can each further include a stripe of thermally conductive material (e.g., stripes 145a, 145b) that thermally link the primary heat-generating component 140a to the thermal shape memory material 120 (e.g., FIG. 1) of the passive control valves 110 (e.g., FIG. 1) of the flow controllers 105a, 105b. As also illustrated in FIG. 8, in some embodiments, it is desirable to position the flow controllers 105a, 105b up-stream from the primary heat-generating component 140a. Such a configuration can facilitate rapid thermal feedback to the valves of the controllers 105a, 105 and thereby help prevent unwanted or premature fluid flow restriction to the other secondary heat-generating components 140b, 140c and enhanced flow to the primary heat-generating component 140a.

As further illustrated in FIG. 8, certain embodiments of the device 100 can include one or more pumps 810 configured to circulate the fluid through the flow controller 105a, 105b and channels 114 of the device 100 as well as deliver and return fluid lines 815, 820, respectively to, e.g., provide a closed fluid circulation loop. One of ordinary skill would be familiar with other components such as heat sinks or heat pipes that the device 100 could further include, e.g., to facilitate temperature control.

Figure 9:
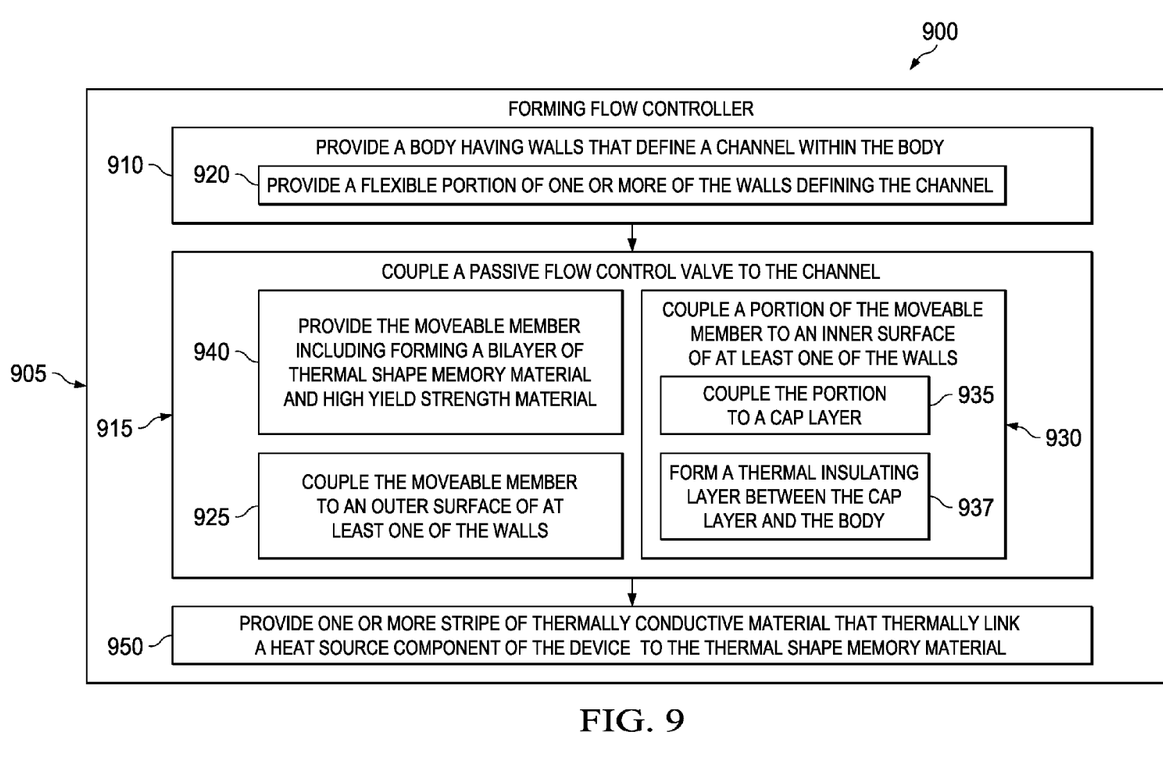
FIG. 9 presents a flow diagram of an example method of manufacturing a device of the disclosure, such as any of the example devices described in the context of FIGS. 1-8.

Another embodiment of the disclosure is a method of manufacturing a device. FIG. 9 presents a flow diagram of an example method 900 of manufacturing a device of the disclosure, such as any of the example devices 100 described in the context of FIGS. 1-8. With continuing reference to FIGS. 1-8, throughout, the example method 900 comprises a step 905 of forming a flow controller 105. Forming the flow controller 105 (step 905) includes a step 910 of providing a body 107 having walls 112 that define a channel 114 within the body 107. For instance, in some embodiments, as part of step 910, a metal or silicon body 107 can be patterned and etched using conventional techniques to form the channel 114 in the body 107.

Forming the flow controller 105 (step 905) also includes a step 915 of coupling a passive flow control valve 110 to the channel 112. As discussed above, the passive flow control valve 110 has a moveable member 115 that includes a thermal shape memory material 120, and, the moveable member 115 is configured to change an aperture 125 size in the channel 112 when the thermal shape memory material 120 undergoes a reversible temperature-induced shape transformation.

In some embodiments, providing the body 107 (step 910) can include a step 920 of providing a flexible portion 130 of one or more of the walls 112 defining the channel 114, wherein the moveable member 115 is configured to move the flexible portion 130 to change the aperture size 125 in response to the temperature-induced shape transformation in the thermal shape memory material 120. For instance, the temperature-induced shape transformation in the thermal shape memory material 120 causes the moveable member 115 to move the flexible portion 130 to change the aperture 125 size. For example, in some embodiments as part of step 920, a portion of a rigid wall 112 (e.g., a metal or silicon wall) can be removed and then replaced with a wall portion 130 composed of a flexible material such as a thin metal layer or plastic material layer. In other embodiments, as part of step 920, a portion 130 of a rigid wall 112 can be thinned down (e.g., by machining, chemical etching of similar procedures familiar to those skilled in the art) so as to be flexible.

In some embodiments, coupling the passive flow control valve to the channel in step 915 includes a step 925 of coupling the moveable member 115 to an outer surface 160 (FIG. 1) of at least one of the walls 112 defining the channel 114. For instance, the member 115 can be coupled to the outer surface 160 mechanically, e.g., using bolts, screws, clamps or other mechanical structures and/or, the member 115 can be coupled to the outer 160 through chemical bonding, e.g., using solder, epoxy glue, or other chemical bonding agents familiar to those skilled in the art.

In other embodiments, coupling the passive flow control valve to the channel in step 915 includes a step 930 of coupling a portion 510 the moveable member 115 to an inner surface 165 (FIG. 1) of at least one of the walls 112 defining the channel 114. For instance, any of the methods used in the context of step 925 for coupling the member 115 to the outer surface 160 can also be used for coupling the member 115 to the inner surface 160 as part of step 930. In some cases, as part of step 930, the portion 510 of the moveable member 115 is coupled, in step 935, to a cap layer 710 (e.g., a surface 730 of the cap layer 710), the cap layer 710 defining one of the walls 112. In some cases, as part of step 930, a thermal insulating layer 720 is formed, in step 937, between the cap layer 710 and the body 107. For instance, in some cases, a layer 720 of insulating material (e.g., siliconoxide or a plastic material) can be formed on the surface 730 of the cap layer 710, e.g., on either side, or surrounding, the part of the surface 730 to which the portion 510 the moveable member 115 is coupled to.

Some embodiments of the method 900 further include a step 940 of providing the moveable member 115 including, in some cases, forming a bilayer 305 of the thermal shape memory material 120 and a high yield strength material 320 (e.g., a material having a yield strength of at least about 200 MPa). For instance, in some cases, as part of step 940, to form the bilayer 305, a layer 310 nitinol, configured as the thermal shape memory material 120, can be laminated to a layer 315 of nitinol, configured as the high yield strength material 320, e.g., to form inter-metallic bonds between the two nitinol layer 310, 315. However, in other embodiments, as part of step 940, the layers 310, 315 can be mechanically coupled, or glued, together.

In some embodiments of the method 900, forming the flow controller 105 (step 905) further includes a step 950 of providing one or more stripe 145 of thermally conductive material that thermally link a heat-generating component 140 of the device 100 to the thermal shape memory material 120, wherein the temperature-induced shape transformation is induced by a change in temperature of the stripe 145. For instance, in some cases, as part of step 950, a thermally conductive material layer such as a copper layer can be machined, molded or otherwise manipulated to form the stripe 145 into a suitable shape and dimension that would allow, e.g., one end 170 (FIG. 1) of the stripe 145 to be coupled to the heat-generating or heat source component 140, and another opposite end 175 (FIG. 1) of the stripe 145 to be coupled to the thermal shape memory material 120. In some cases, as part of step 950, the opposite end 175 of the stripe 145 can be coupled to another structure e.g., a wall 112 portion 130, that is in close enough proximity to the thermal shape memory material 130 to facilitate the temperature-induced shape transformation in the material 120.

Although the present disclosure has been described in detail, those skilled in the art should understand that they can make various changes, substitutions and alterations herein without departing from the scope of the invention.

What is claimed is:

1. A device, comprising:
   a flow controller, including:
   a body having walls that define a channel within the body;
   a passive flow control valve having a moveable member that includes a thermal shape memory material, the moveable member configured to change an aperture size in the channel in response to a reversible temperature-induced shape transformation of the thermal shape memory material; and
   a stripe of thermally conductive material configured to thermally link a heat source component of the device to the thermal shape memory material, the stripe being configured to induce the temperature-induced shape transformation by a change in temperature of the stripe from heat transferred to the stripe from the heat source component, wherein the moveable member does not require electrical components to control the change in aperture size.

2. The device of claim 1, wherein the thermal shape memory material is a shape memory alloy.

3. The device of claim 1, wherein the thermal shape memory material is a nitinol alloy.

4. The device of claim 1, wherein the moveable member includes a bilayer that has a layer of the thermal shape memory material and a layer of high yield strength material, wherein the high yield strength material does not permanently deform throughout the temperature-induced shape transformation of the thermal shape memory material and the high yield strength material has a yield strength of at least about 200 MPa.

5. The device of claim 1, wherein the flow controller further includes a flexible portion of one or more of the walls defining the channel, wherein the moveable member located outside of the channel is configured to move the flexible portion to change the aperture size in response to the temperature-induced shape transformation in the thermal shape memory material.

6. The device of claim 5, wherein the moveable member is adjacent to the flexible portion of the one or more walls.

7. The device of claim 1, wherein one end of the stripe contacts the heat source component and an opposite end of the stripe of thermally conductive material contacts the thermal shape memory material.

8. The device of claim 1, wherein the thermal shape memory material is located in the channel and a fluid in the channel is capable of inducing the temperature-induced shape transformation by a change in temperature of the fluid in the channel.

9. The device of claim 1, wherein a portion of the moveable member is coupled to at least one of the walls of the channel.

10. The device of claim 9, wherein a portion of the moveable member is coupled to a cap layer, the cap layer defining at least one of the walls.

11. The device of claim 10, further including a thermal insulating layer located between the cap layer and the body.

12. The device of claim 1, wherein the passive flow control valve includes two or more of the moveable members, each one of the moveable members configured to change the aperture size at a different temperature.

13. The device of claim 1, wherein the device includes a network of flow controllers, wherein each one of the flow controllers is configured to control the flow rate of a fluid through the channel.

14. The device of claim 13, wherein two or more of the flow controllers are configured to operate in cooperation with each other to increase the flow rate to one heat source component and decrease the flow rate to one or more other heat source components.

15. A method of manufacturing a device, comprising:
forming a flow controller, including:
providing a body having walls that define a channel within the body;
coupling a passive flow control valve to the channel, the passive flow control valve having a moveable member that includes a thermal shape memory material, the moveable member configured to change an aperture size in the channel when the thermal shape memory material undergoes a reversible temperature-induced shape transformation; and
providing a stripe of thermally conductive material configured to thermally link a heat source component of the device to the thermal shape memory material, the stripe being configured to induce the temperature-induced shape transformation by a change in temperature of the stripe from heat transferred to the stripe from the heat source component;
wherein the moveable member does not require electrical components to control the change in aperture size.

16. The method of claim 15, wherein providing the body includes providing a flexible portion of one or more of the walls defining the channel, wherein the moveable member is configured to move the flexible portion to change the aperture size in response to the temperature-induced shape transformation in the thermal shape memory material.

17. The method of claim 15, wherein coupling the passive flow control valve to the channel includes coupling the moveable member to an outer surface of at least one of the walls defining the channel.

18. The method of claim 15, wherein coupling the passive flow control valve to the channel includes coupling a portion of the moveable member to an inner surface of at least one of the walls of the channel.

19. The method of claim 16, further including providing the moveable member including forming a bilayer of the thermal shape memory material and a high yield strength material having a yield strength of at least about 200 MPa.

20. The method of claim 16, wherein one end of the stripe contacts the heat source component and an opposite end of the stripe of thermally conductive material contacts the thermal shape memory material.

* * * * *